United States Patent [19]

Hubbard

[11] 4,243,018
[45] Jan. 6, 1981

[54] SOLAR ENERGY CONCENTRATOR

[75] Inventor: S. Eugene Hubbard, Niles, Mich.

[73] Assignee: Kawneer Company, Inc., Niles, Mich.

[21] Appl. No.: 916,816

[22] Filed: Jun. 19, 1978

[51] Int. Cl.³ ............................................. F24J 3/02
[52] U.S. Cl. .................................... 126/425; 128/438
[58] Field of Search ............................... 126/424, 425

[56] References Cited

U.S. PATENT DOCUMENTS

| 1,951,404 | 3/1934 | Goddard | 126/425 |
| 3,861,379 | 1/1975 | Anderson | 126/425 |
| 3,905,352 | 9/1975 | Jahn | 126/425 |
| 4,022,184 | 5/1977 | Anderson | 126/425 |
| 4,146,785 | 3/1979 | Neale | 126/425 |
| 4,149,525 | 4/1979 | Prado | 126/450 |

Primary Examiner—Carroll B. Dority, Jr.
Attorney, Agent, or Firm—Mason, Kolehmainen, Rathburn & Wyss

[57] ABSTRACT

A solar energy concentrator comprises an elongated, linear collector for receiving concentrated solar energy, mounted to extend longitudinally in an East-West direction and spaced above a supporting surface. An array of separate, elongated solar energy reflectors are provided for reflecting received solar energy upwardly and focusing the same along the collector. The reflectors are mounted in parallel, elongated rows, parallel of the collector and at a level below the same. The reflectors are aligned coaxially in end to end relation in rows and are formed into modular columns transverse or normal to the collector. Each reflector is mounted in a support for individual pivotal movement about a longitudinal axis parallel of the collector and a novel drive system is provided for interconnecting the supports and pivoting the same in unison to substantially continuously reflect the received solar energy in a focused manner on the collector as the angle of elevation of the sun's rays is changed during the day.

20 Claims, 11 Drawing Figures

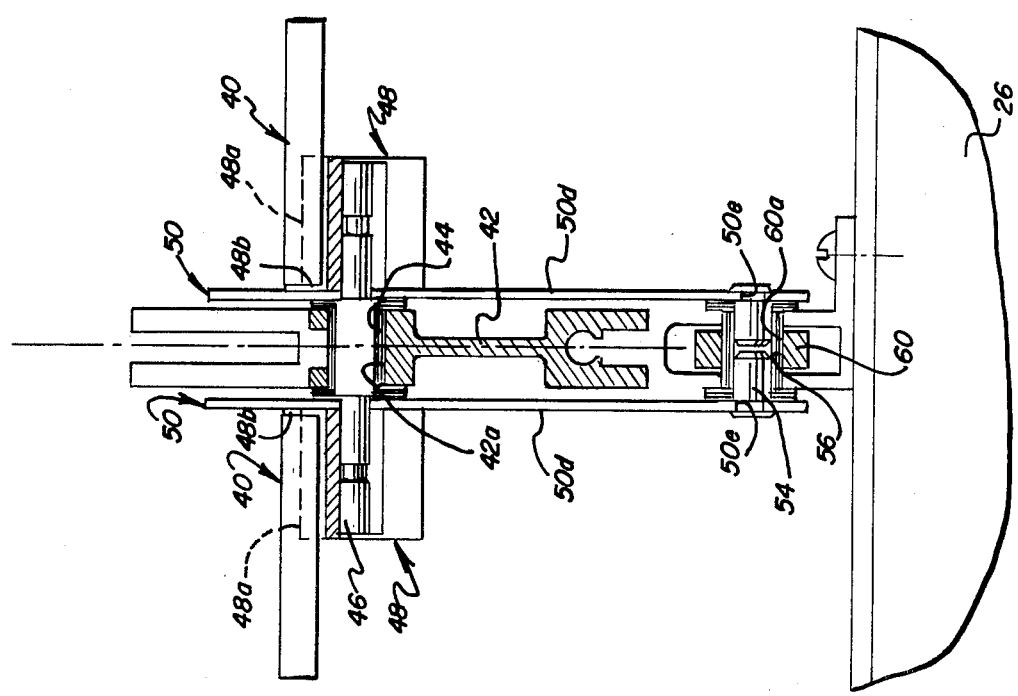
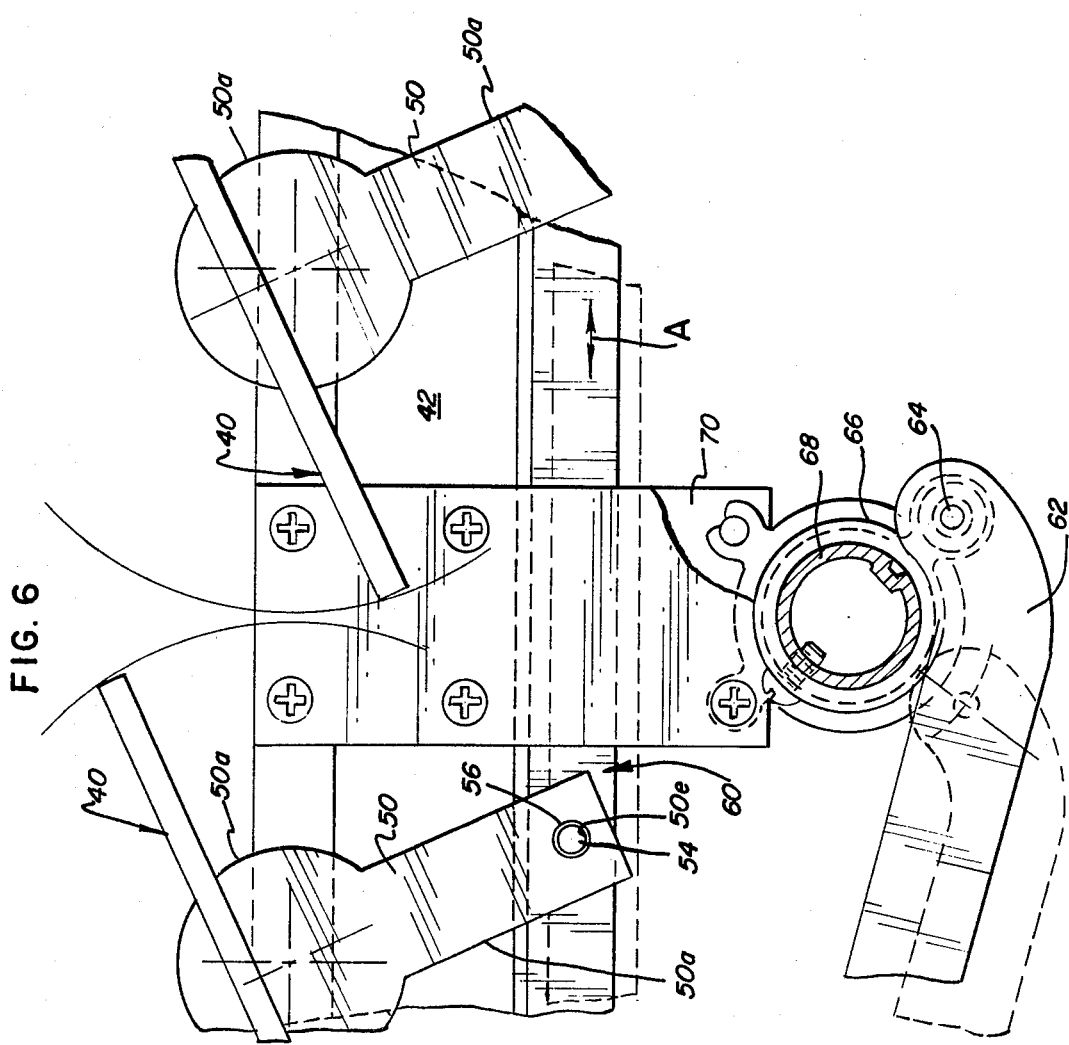

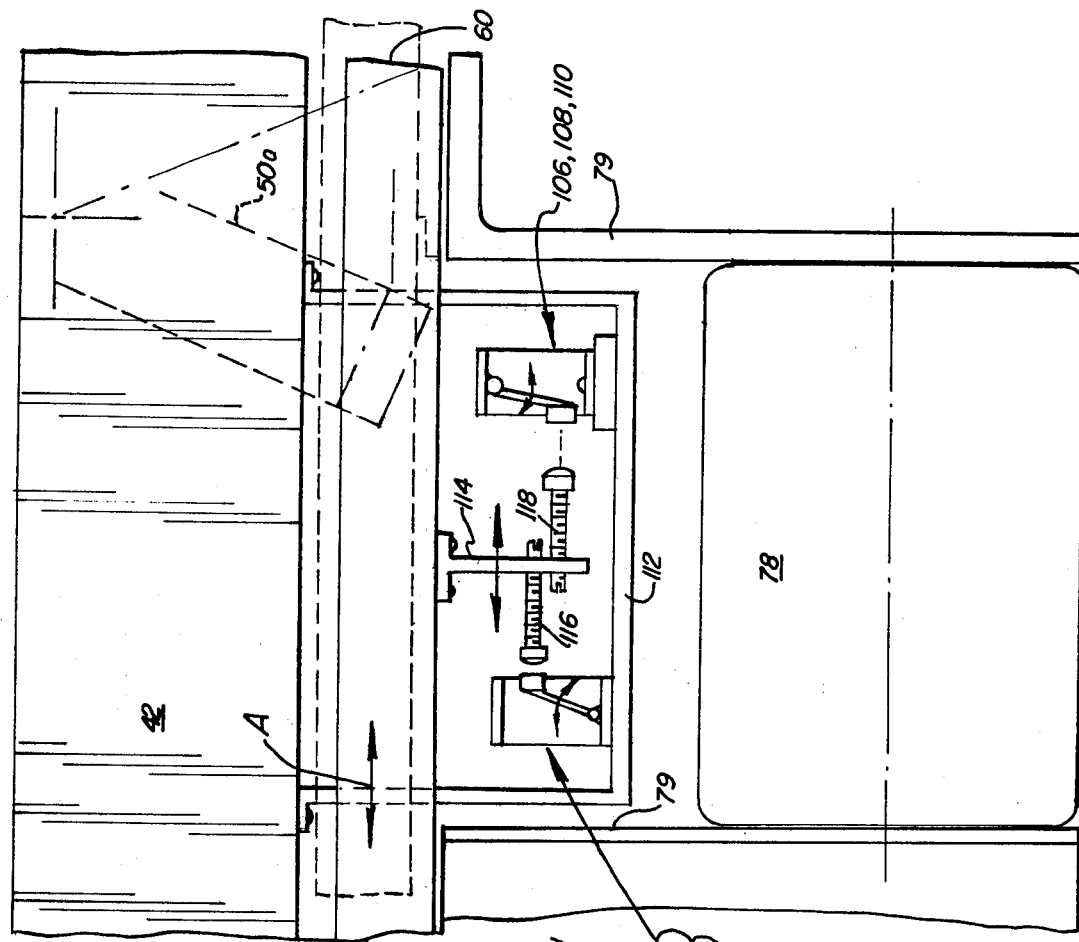
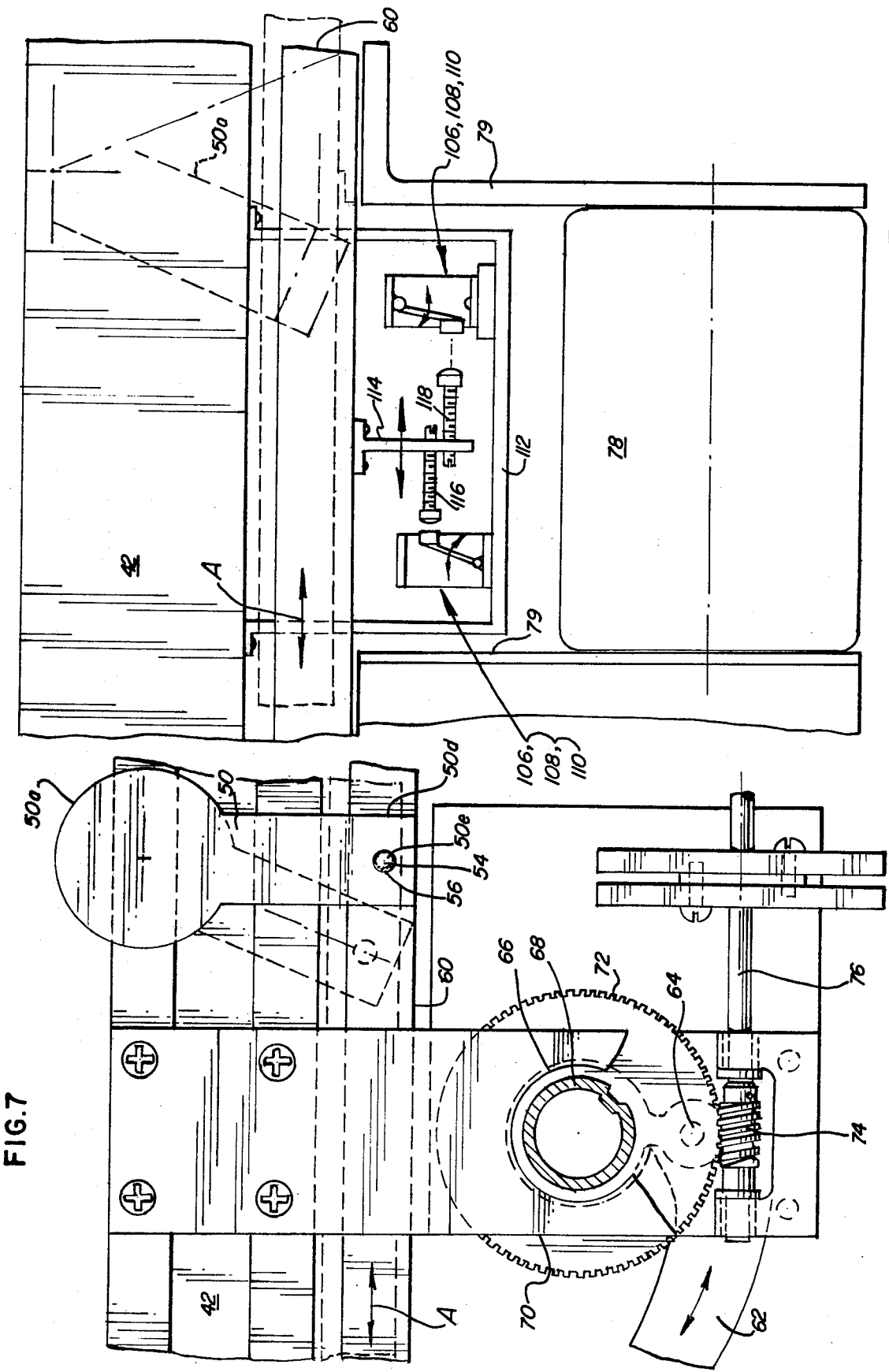

SOLAR ENERGY CONCENTRATOR

BACKGROUND OF THE INVENTION

1. Field of the Invention

The present invention relates to a new and improved solar energy concentrator for focusing and concentrating received solar energy onto a fixed linear collector.

More particularly, the solar energy concentrator of the present invention includes a tracking system wherein a plurality of separate pivotally supported reflectors are provided in an array and are moved as required to substantially continuously reflect and focus the solar energy received upwardly toward a fixed linear collector.

2. Description of the Prior Art

Many different types of concentrators have been provided for directing solar energy as received toward a collector positioned at a focal point or extending along a focal line. Some of these concentrators have been built and tested but, have run into a wide variety of problems making them uneconomical to build and/or operate in reference to the amount of solar energy actually collected thereby. One thermostatically controlled non-tracking type solar energy concentrator is shown in U.S. Pat. No. 3,915,148 and this concentrator uses a lens system for focusing the sun's ray in a line image extending in an East-West direction. This focused energy is directed toward one or more collector channels positioned to extend in an East-West direction and the energy is used for heating a fluid which is directed through the channels as controlled by thermostatic valves.

The present invention provides a fixed, elongated, linear collector unit for receiving focused solar energy from a plurality of pivotally supported individual reflectors mounted in an array which are driven to move in unison by a drive system so that the reflected rays are substantially continuously focused on the collector as the angle of elevation of the sun's rays changes during the day from morning to night.

Accordingly, it is an object of the present invention to provide a new and improved solar energy concentrator.

It is another object of the present invention to provide a new and improved solar energy concentrator employing a fixed linear collector arranged to extend longitudinally in an East-West direction and spaced above an array of separate, pivotally mounted solar energy reflectors which are driven to reflect the received solar energy and focus the same along the collector.

Another object of the present invention is to provide a new and improved solar energy concentrator of the character described having a new and unique drive system for moving the reflectors in the array to substantially continuously maintain a focus of energy on the collector as the angle of elevation of the received solar energy changes during the day from sunrise to sunset.

Yet another object of the present invention is to provide a new and improved solar energy concentrator having a novel and efficient enclosure system which prevents contamination of the reflective surfaces and maintains the concentrator in operation at relatively high or peak efficiencies.

Yet another object of the present invention is to provide a new and improved solar energy concentrator of the character described having a novel drive system for moving the array of individually pivotal reflectors in unison to efficiently concentrate the received solar energy in the collector.

Still another object of the present invention is to provide a new and improved solar energy concentrator having novel supports permitting individual adjustment of each of the reflectors in an array thereof to provide for a maximum efficiency of concentration of the energy on a fixed linear collector.

Yet another object of the present invention is to provide a new and improved solar energy concentrator of the character described which provides a modular system or reflectors in an array of rows and columns readily adapted to be driven to provide a substantially continuous concentration of the received solar energy focused toward an elongated linear collector as the angle of elevation of the received solar energy changes during the day.

Yet another object of the present invention is to provide a new and improved solar energy concentrator of the character described including means for sensing the level of solar energy after the rays are focused toward a collector.

More particularly, it is another object to provide a new and improved solar energy concentrator of the character described including means for sensing the level of focused solar energy adjacent a fixed collector and operable for activating and deactivating a drive means for moving a plurality of reflectors in response to a selected level of energy.

More particularly, it is an object of the present invention to provide a new and improved solar energy concentrator including means for deactivating a drive system for moving the reflectors whenever the focused solar energy is below a selected minimum value.

Yet another object of the present invention is to provide a new and improved solar energy concentrator of the character described including drive means for substantially continuously maintaining a maximum value of focused reflective energy adjacent a fixed linear collector extending in an East-West direction longitudinally.

Yet another object of the present invention is to provide a new and improved solar energy concentrator of the character described employing a novel drive means for moving a plurality of individual reflectors in a modular array thereof in a manner minimizing angular deflection errors in focusing the received solar energy toward a fixed linear collector.

Yet another object of the present invention is to provide a new and improved solar energy concentrator of the character described having novel means for acquiring and following the sun as a source of solar energy in a manner maxmizing the value of concentrated focused energy on a fixed linear collector.

Yet another object of the present invention is to provide a new and improved solar energy concentrator having a new and improved enclosure which minimizes operational maintenance and provides a maximum efficiency of energy collection.

Yet another object of the present invention is to provide a new and improved solar energy concentrator of the character described which is relatively low in initial cost and relatively low in periodic maintenance and operational costs in relation to the amount of solar energy collected.

BRIEF SUMMARY OF THE INVENTION

The foregoing and other objects and advantages of the present invention are accomplished in an illustrated embodiment comprising a new and improved solar energy concentrator having an elongated, fixed linear collector for receiving concentrated solar energy mounted to extend in an East-West direction spaced above a supporting surface. A modular array of rows and columns of individual, elongated solar energy reflectors such as mirrors are provided for reflecting the rays of solar energy received and focusing the same upwardly in concentrated fashion along the fixed collector. The reflectors are mounted in parallel, elongated rows, parallel to the collector and at a level spaced below the collector in end to end relation. An individual pivotally mounted support is provided for each reflector in the array to permit pivotal movement thereof about a longitudinal axis to accurately focus the energy received toward the collector. Novel drive means is provided for interconnecting the reflector supports of each column in the array for pivotally moving the reflectors in unison to substantially continuously reflect the received rays of solar energy toward a linear focus along the collector as the angle of elevation of the received solar energy changes during the day from sunrise to sunset.

BRIEF DESCRIPTION OF THE DRAWINGS

For a better understanding of the present invention, reference should be had to the following detailed description taken in conjunction with the drawings, in which:

FIG. 5 is a greatly enlarged, fragmentary, transverse, vertical, cross-sectional view taken substantially along lines 5—5 of FIG. 4;

FIG. 6 is a greatly enlarged, vertical, transverse, cross-sectional view taken substantially along lines 6—6 of FIG. 1;

FIG. 7 is a greatly enlarged, fragmental, vertical, cross-sectional view taken substantially along lines 7—7 of FIG. 1;

FIG. 8 is a greatly enlarged, vertical, transverse, cross-sectional view taken substantially along lines 8—8 of FIG. 1;

DESCRIPTION OF THE PREFERRED EMBODIMENT

Figure 1:
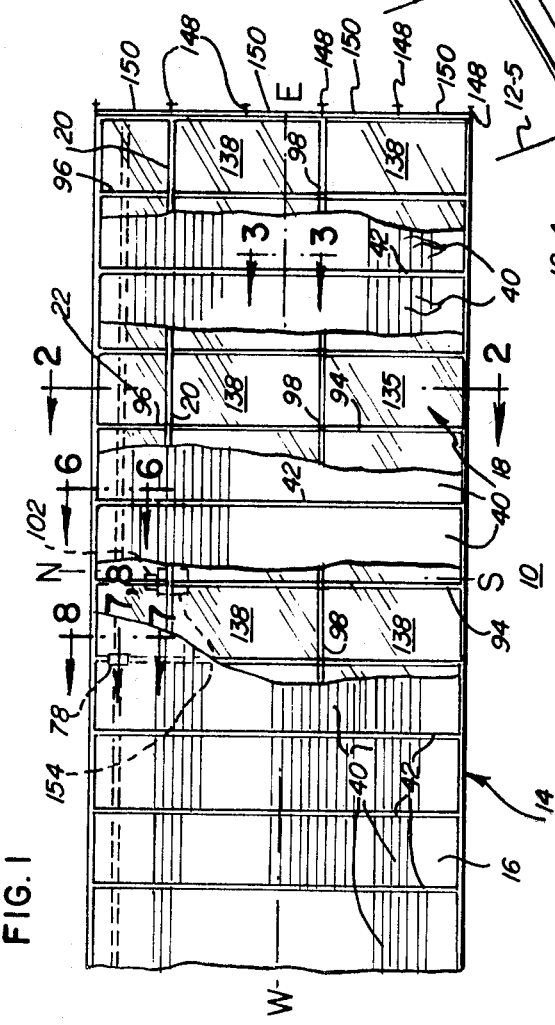
FIG. 1 is a top plan view of a solar energy concentrator constructed in accordance with the features of the present invention with portions cut away showing the interior details of an array of reflectors thereof.
Figure 2:
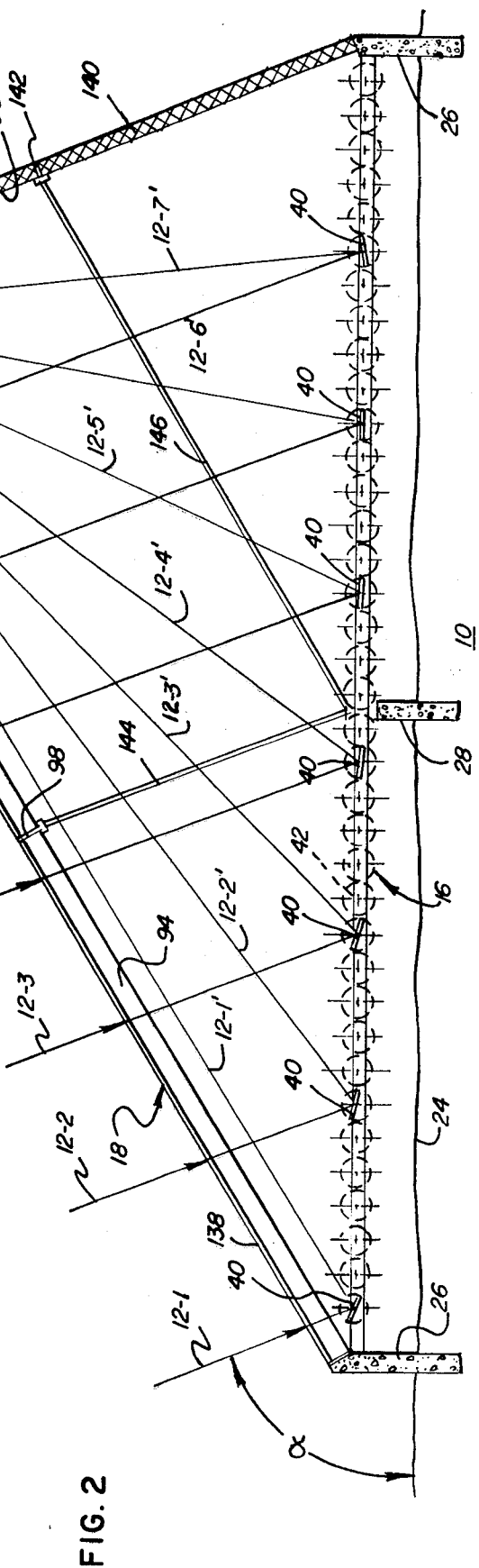
FIG. 2 is a vertical, transverse, cross-section of the concentrator taken substantially along lines 2—2 of FIG. 1.

Referring now more particularly to the drawings, in FIGS. 1 and 2 is illustrated a new and improved solar energy concentrator constructed in accordance with the features of the present invention and referred to generally by the reference numeral 10. The concentrator 10 is adapted to receive solar energy in the form of parallel rays 12-1, -2, -3, -4, -5, -6, -7, from the sun at an angle of elevation alpha relative to the horizontal which changes with the seasons of the year and is dependent upon the geographical location of the concentrator. During each day, as the sun moves from East to West, the angle of elevation alpha changes by a few degrees, but for all practical purposes, however, during any given day, the angle of elevation (from a few hours before to a few hours after the noon hour or meridian) can be thought of as being relatively constant and the movement of the sun is approximated to be in a place sloped at the angle alpha, which is extended in an East-West direction and intersects the surface of the earth in an East-West line.

The concentrator 10 is arranged with a longitudinal axis thereof represented by the center line marked W-E and lying in an East-West direction so that as the sun rises in the morning and moves to sunset, it follows a linear path from the right hand end of the concentrator 10 as shown in FIG. 1, toward the left hand end. Between the hours of approximately 10 A.M. to 2 P.M., the sun moves in a plane which changes in angle of elevation alpha by a relatively few degrees for all practical purposes.

The concentrator 10 includes a housing or enclosure 14 having a rectangular base or floor structure 16, a roof structure or wall 18 sloping upwardly from a Southerly longitudinal edge of the floor structure toward a ridge or apex 20 which is interconnected or joined with the upper edge of a back wall 22 sloping upwardly at a somewhat steeper angle from the Northerly longitudinal edge of the floor structure. As illustrated in FIG. 2, the enclosure or housing 14 may be supported above the earth's surface which is represented by the numeral 24 or other structural surface on a suitable foundation wall 26 of concrete or other appropriate material formed to enclose the periphery of the floor structure. A number of intermediate posts or walls 28 may be utilized as required to provide adequate physical support for the floor and roof structures at points or locations within the interior of the housing or enclosure 14.

In accordance with the present invention, the housing or enclosure 14 provides support for an elongated, linear, energy collecting element 30 supported below the ridge 20 of the enclosure and extended in an East-West direction spaced above the level of the floor structure 16. The linear collector 30 may comprise a hollow, tubular conduit for containing a flow of heat conductive gas or fluid heat for absorbing the heat of concentrated or focused sun rays. In the alternative, the collector may comprise photo-coltaic cells which are adapted to convert the reflected solar energy into electrical energy is useful quantities or may include fibre-optic materials for receiving the reflected sunlight and directing the same to another location for conversion into electrical energy. This latter alternative is advantageous in that quartz fibres can withstand the high temperatures produced. There may also be provided a parabolic cross-sectionally shaped reflector 32 for further focusing the reflected solar energy toward the linear collector element which is positioned at the focal point thereof of the parabolic profile.

In accordance with the present invention, the linear collector 30 is adapted to receive concentrated or focused solar rays 12-1', -2', -3', -4', -5', -6', -7', which have been reflected upwardly from a plurality of elongated, rectangular reflectors 40 aligned longitudinally in end to end relation in East-West rows and transversely extending North-South oriented columns as best shown in FIGS. 1 and 2. Each reflector is supported for pivotal movement relative to a longitudinal, East-West, centrally disposed pivot axis to that the incoming rays of the sun which strike a reflective, mirrored surface 40a on the bottom face thereof are reflected upwardly at a proper angle and are focused or concentrated on the linear collector 30. Referring momentarily to FIG. 2, it will be seen that an incoming sun ray 12-1 strikes a row of reflective mirrors that are closely adjacent the Southerly edge of the concentrator housing and these mirrors are tilted at an angle so that a reflective ray 12-1' is directly upwardly to strike the elongated collector 30. Similarly, the incoming parallel sun rays 12-2, -3, etc. strike different rows of reflectors, each of which is set at a particular angle so that the reflected rays 12-2', -3', respectively, will be concentrated and focused on the elongated collector 30 adjacent the ridge 20 of the enclosure.

The reflectors 40 may be high quality, glass mirrors or may be highly polished metal elements so that a maximum efficiency of reflected energy is achieved. Each reflector in each individual row of reflectors is selectively adjusted with a tilt angle so that the parallel incoming rays striking all of the mirrors will be concentrated or focused upwardly towards the linear collector 30.

As illustrated in FIG. 2, each row of reflective mirrors 40 will have a slightly different angle of tilt or elevation with respect to adjacent rows and this is necessary so that the incoming parallel sun rays will all be focused to converge upwardly or a focus on the linear collector 30. As indicated in the plan view of FIG. 1, the reflective mirrors are arranged in a rectangular array including columns extending on a North to South axis and the mirrors are set in longitudinally aligned rows extending in an East-West direction.

Figure 3:
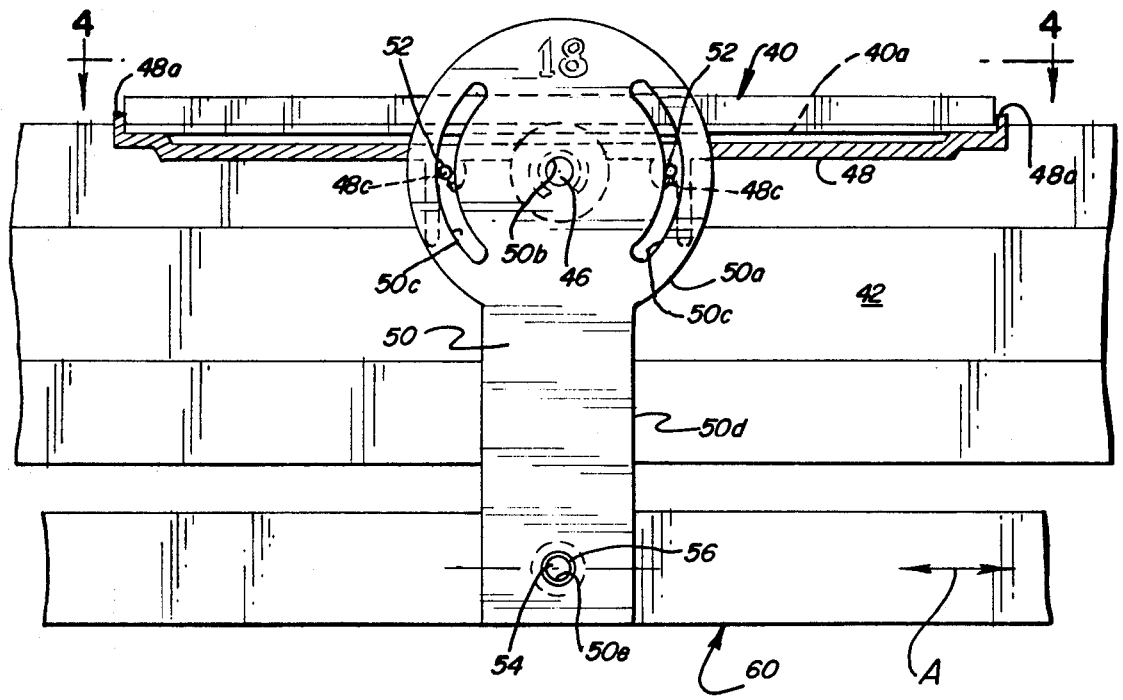
FIG. 3 is a greatly enlarged, fragmentary, vertical, cross-sectional view taken substantially along lines 3—3 of FIG. 1.
Figure 4:
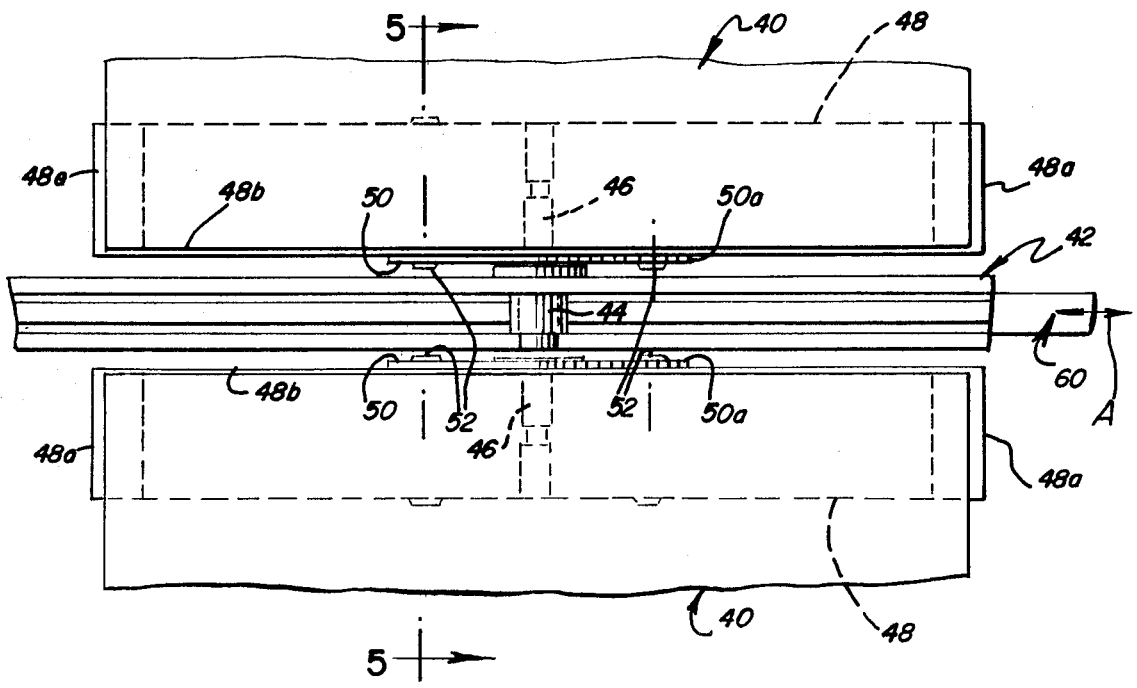
FIG. 4 is a fragmentary, greatly enlarged, horizontal, cross-sectional view taken substantially along lines 4—4 of FIG. 3.

Each reflector is supported for individual pivotal movement adjacent its opposite ends from a pair of spaced apart parallel rails 42 of the floor structure 16 and these rails extend in a North-South direction forming transverse structural emembers or joists of the floor structure. The rails 42 are shown in transverse cross-section in FIG. 5, and are formed with a plurality of openings 42a in the web which are spaced at suitable intervals aligned with the central axes of the mirrors. In each opening, an annular sleeve bearing 44 is provided to support a stub axle 46 extending laterally outwardly from opposite sides of the rail. Each stub axle carries a pair of mirror and support pans or trays 48 and the pans are formed with lips 48a at opposite ends for containing the longitudinally extending, opposite edges of the mirrors that are carried thereon. The pans also include end walls 48b adapted to abut opposite ends of the reflective mirrors. As best shown in FIGS. 3, 4 and 5, it will be seen that each mirror 40 is supported at opposite ends for adjustable pivotal movement about a longitudinal center axis by a pair of trays or pans 48 which are carried on the outer ends of stub axles 46. The stub axles are rotatable in bearing sleeves 44 mounted in the openings 42a of the rails 42.

In accordance with the present invention, pairs of mirror support trays or pans 48 disposed on opposite sides of each joist or rail 42 in the floor structure 16, are provided with keyhole shaped actuating arms 50 used for pivoting the mirrors in order to maintain the focus of the upwardly reflected rays concentrated on the linear collector 30 as the sun angle alpha changes. Each of the actuating arms 50 includes a circular, enlarged upper end portion 50a having a central aperture 50b aligned with a supporting stub axle 46 as best shown in FIGS. 3 and 4. In addition, the enlarged upper end portion 50a of each arm is formed with a pair of arcuately shaped slots 50c disposed on opposite sides and in concentric relation with the central aperture 50b. These arcuate slots are aligned with a pair of extruded splines 48c formed on the underside of the mirror support pans 48 (FIG. 3) in order to receive headed fasteners 52. These fasteners include shanks which extend through the arcuate slots and into the extruded splines 48c of the mirror supporting pans to hold the arm and support pan in a selected angular relation.

Each keyhole shaped arm 50 also includes a downwardly depending leg portion 50d having an aperture 50a or 50e adjacent the lower end for accommodating a knuckle pin 54 (FIG. 5) which is mounted in a sleeve bearing 56 seated in an aperture 60a provided in an elongated column actuator rod 60 having a plurality of such apertures spaced at longitudinal intervals at the same spacing distance between the parallel longitudinal center axes of the mirror reflectors 40 in adjacent rows of the array.

Referring now to FIGS. 3, 4, 5, 6, 7 and 8, each column actuator rod 60 is provided to control the movement of a pair of North-South columns of reflectors 40 disposed on opposite sides thereof. A single column actuator rod is interconnected with a pair of arms 50 on opposite sides of the supporting rail 42 for each row of reflectors in the array and these arms in turn, are adjustably interconnected to pivot the mirror support pans or trays 48 associated therewith. The column actuator rods are movable back and forth longitudinally as indicated by the arrows "A" causing the actuator arms 50 to pivot and thereby move the reflective mirror 40 of each column to pivot in unison and continuously focus and concentrate the reflected solar energy rays on the linear collector 30.

A column actuator rod is interconnected to all of the depending arm portions 50d of the adjacent reflector mirrors 40 on opposite sides of the rail 42, and each individual mirror support pan 48 is connected at the time of manufacture at the desired angle to accurately focus its reflective sun rays on the collector 30.

The arms are numbered as shown in FIG. 3 and the numbers refer to the row in the array. It will thus be seen that each mirror 40 is driven to rotate by the rotatable support trays at opposite ends thereof. After the desired angular alignment between an arm and support tray is set (preferably on a jig at the factory, the fasteners 52 are inserted or tightened with their heads against the edges of the arcuate slots 50c in the upper portions 50a of the arms to secure the correct relative angular position between the arm and the reflector support 48 associated therewith. During operation, movement of the column actuator rods longitudinally in one direction or the other, will continuously focus reflected rays from mirrors 40 in the array on the linear collector, and because each mirror is supported at both ends and rotated by a pair of column actuator rods, backlash is eliminated or greatly reduced and an accurate focusing of the reflected sun's rays is achieved as the mirrors are driven to rotate during the day's operation.

A substantially continuous focus or convergence of the reflected rays 12-1', -2', -3' etc. is maintained on a focal area around the linear collector 30 and its surrounding reflector 32 as shown in FIG. 2 in this manner.

The respective parallel column actuator rods 60 are driven to move in a linear fashion back and forth to move the respective columns of mirrors 40 to follow the sun and focus a linear image on the collector 30. For this purpose, each actuator rod is pivotally interconnected with an arm 62 (FIGS. 6 and 7) having an opposite end pivotally connected by a pin 64 to a collar 66 mounted on a common drive shaft 68 extending longitudinally of the array of reflectors in an East-West direction. The shaft 68 is supported on suitable bearing brackets 70 depending downwardly at appropriate intervals from the respective rails 42 in the floor structure 16 of the concentrator enclosure. The drive shaft is of a relatively large diameter and low weight construction to minimize the amount of rotational deflection or backlash along its length. This helps to maintain accurately focused reflected energy from the reflectors of the array going from column to column.

The shaft is driven to rotate from a mid-point longitudinally thereof by means of a drive gear 72 which is keyed to the shaft and is mounted adjacent a mid-point on the shaft which extends outwardly thereof in opposite directions along an East-West direction. The shaft is rotatable in both directions as required and the gear 72 is driven by a worm 74 mounted on the outer end portion of a drive shaft 76 on a reversible, electrically powered motor 78 operating through a high ratio reduction gear train. As illustrated in FIGS. 1 and 8, the motor and the reduction gearing are mounted on supportive brackets 79 depending downwardly from a middle rail 42 in the floor structure 16. When the reversible drive geat motor 78 is electrically energized to rotate in one direction, the single shaft 68 and the respective column actuator rods 60 linked therewith are activated to move in a given direction and when the direction of rotation of the motor is then reversed, the column actuator rods 60 move in an opposite direction causing the respective mirror reflectors 40 in the columns on either side thereof to pivot as previously described. In this manner a substantially continuous maintenance of the focus or concentration of reflected sun rays 12-1', -2', -3', etc. on the linear collector 30 at the apex or ridge of the enclosure is achieved.

In order to further reduce the possibility of inaccurate focusing of the reflected rays, the number of columns of mirrors on each side of the central drive motor is limited so that any rotational deflection of the drive shaft 68 which might occur because of friction or binding of the linkage is minimized. This of course, limits the East-West length of the array that a single drive motor can efficiently operate and if additional reflective areas are needed, separate arrays may be provided, each having its own drive system.

In order to maintain a maximum efficiency in operation of the concentrator 10, the housing or enclosure 14 provides protection against outside weather elements so that reflective mirrors 40 do not collect dust, dirt or other contaminating materials which will reduce the reflective efficiency thereof. In this connection, the concentrator housing 14 is provided with a plurality of upwardly sloping rafters 94 extending upwardly from the Southerly foundation wall of the enclosure to the apex or ridge 20. Preferably, the rafters are aligned directly above the rails 42 of the floor structure 16 and are interconnected at the apex or ridge with upwardly sloping, back wall rafters or uprights 96 as shown in FIG. 2. Intermediate the ends of the rafters there may be provided longitudinally extending purlins 98 which provide support for horizontal edges of rectangular, glazing panels 138 used to keep out dust and other weather elements, yet permit the solar rays 12-1, -2, -3, etc. to pass downwardly therethrough for reflection from the rows of reflective mirrors 40 as previously described. The glazing panels may be readily cleaned from outside of the enclosure from time to time to minimize energy losses while the inside area within the structure is maintained substantially free of dust, dirt and other contaminating influences.

The sloping back wall 22 of the concentrator housing 14 is provided with a wall structure 140. The wall including backside panels are disposed between adjacent backside rafters or uprights 96 and horizontal backside purlins 142 may be provided between adjacent rafters for supporting the horizontal edges of the insulating panels. If required, as dependent upon the span or length of the rafters 94 and the back wall uprights 96, intermediate braces 144 and 146 may be provided and these are supported at the lower ends from the intermediate foundation wall or posts 28.

As viewed in FIG. 1, the concentrator enclosure is also provided with a triangular shaped end wall structure having parallel vertical columns 148 projecting upwardly from the foundation end walls 26 to the end most rafters 94. A plurality of transparent glazing panels 150 are provided between the upright columns 148 in order to permit the entry of low angle, East-West sun rays onto the array of mirrors 40 when the sun is beginning to rise in early morning or finally beginning to set in the late of the day. As the sun begins to rise, in the East, its rays are at a relatively low angle of elevation with respect to an East-West latitude line and these rays enter the enclosure 16 of the concentrator 10 through the Eastern end wall structure glazing panels 150. These rays are deflected upwardly in a Westerly direction by the mirrors 40 towards the linear concentrator 30 and because of the relatively low angle they may strike the concentrator 30 only at a Westerly end portion thereof.

As the sun rises in the sky during the middle portion of the day, the angle of elevation "alpha" as measured relative to a North-South longitudinal line reaches a maximum at the mid-day meridian and changes very little in the period from about two hours before through two hours after the meridian is reached. However, as the angle "alpha" of the sun's rays begins to increase during the mid-morning and decrease in the mid or late afternoon, the mirror tilting and drive control system as described in accordance with the present invention, maintains on a substantially continuously basis, a maximum concentration or focusing of the reflected rays on the linear collector. During the middle portion of the day, most of the sun's rays are received through the roof glazing panels 138 rather than the end wall panels 150 at either end of the enclosure.

From the foregoing, it will be seen that the solar energy concentrator in accordance with the present invention provides an extremely efficient means of concentrating and collecting solar energy for a variety of different purposes. Any number of arrays as described, may be provided in an even larger array. The amount of solar energy collected is roughly proportional to the rectangular area of the whole array of mirrors within an enclosure. Extremely long enclosures in the East-West direction may be provided if desired, however, in order to minimize backlash on the shafts and drive elements of the drive system because of angular deflection of the drive shafts and frictional problems, it is desirable to provide a plurality of separate, drive motors 78 and shafts spaced in parallel at appropriate intervals along the length of an extremely long enclosure. This will ensure that a maximum reflective concentration is maintained and continued operation.

Figure 9:
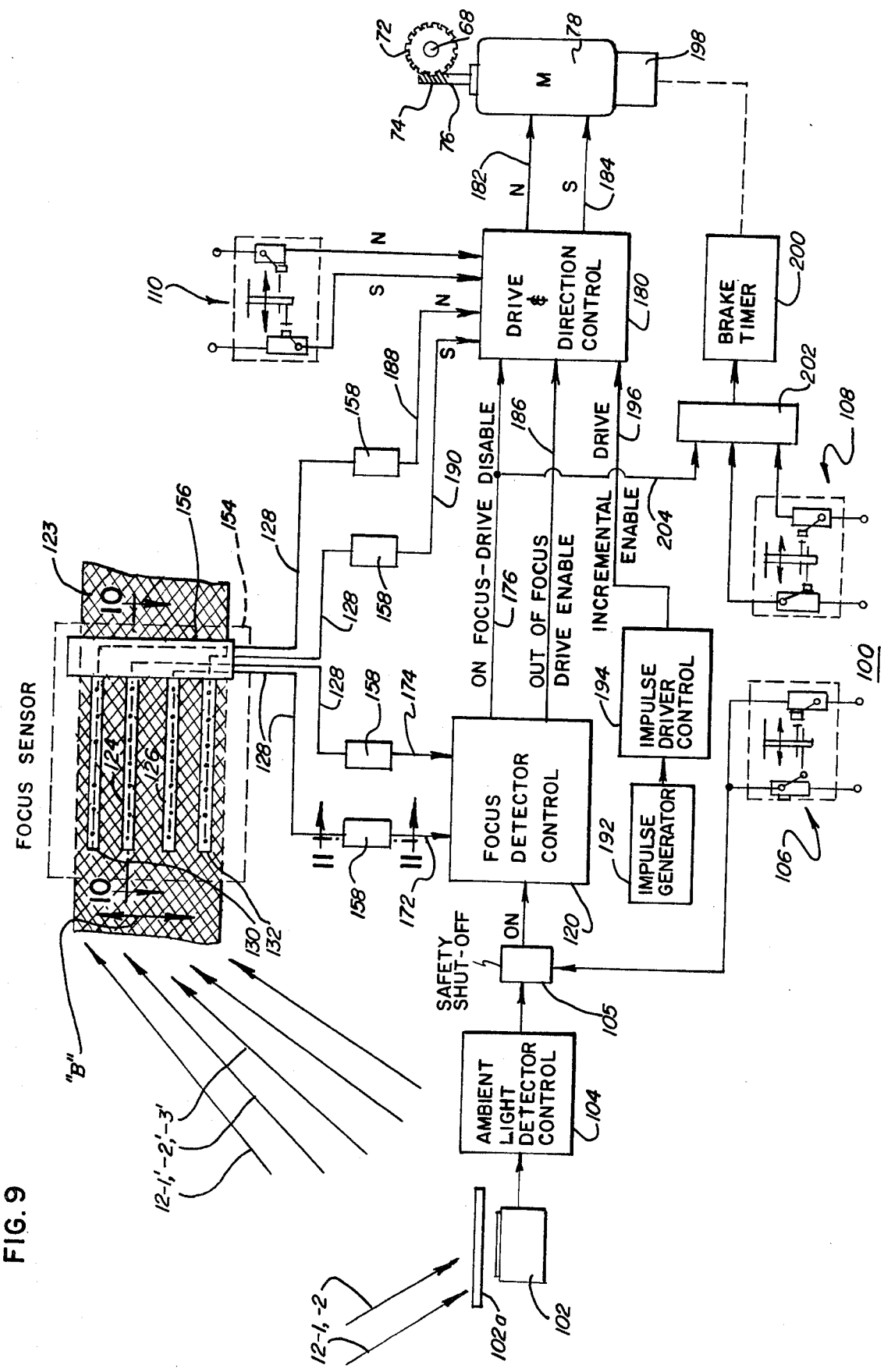
FIG. 9 is a schematic diagram illustrating an electrical circuit of the drive system used with the array of reflectors of the concentrator for controlling the movement thereof in accordance with the present invention.

In accordance with the present invention, a control circuit 100 as illustrated schematically in FIG. 9, is provided for energizing the reversible drive motor 78 in both directions to pivot the mirrors 40 in a manner to maintain a substantially continuous focus or concentration of the reflected sun rays 12-1', -2', -3', etc. on the linear collector 30 as the angle of elevation "alpha" of the incoming sun rays 12-1, -2, etc. changes during the day and day to day during the seasons. Referring particularly to FIGS. 2 and 9, an ambient light photosensor 102 comprising a solar cell is mounted outside the housing 14 to sense the level of the ambient light available. Preferably, the solar cell is provided with an infra-red filter 102a so that it will be sensitive only to infra-red energy and can thus determine when the tracking sensors are able to follow the sun's image even on cloudy days.

When the level of energy sensed is above an adjustable set point, the concentrator 10 is turned on and an enabling input signal is directed into an ambient detector switching module 104. If the level of energy sensed is below the set value that would render collection uneconomical, the switch module is not enabled and the system remains in an off condition.

As illustrated in FIG. 8, the concentrator is provided with three sets of limit switches 106, 108 and 110, respectively, carried on U-shaped brackets 112 which are mounted adjacent the central rail 42 of the floor structure and the switch sets are selectively activated by elements 114, each of which carries a pair of adjustable switch actuators 116 and 118. The elements 114 are mounted on the central control column actuator 60 and are movable along a North-South axis between the pairs of limit switches in each set as the mirrors 40 are pivoted.

An outer set of safety limit switches 106 provides a safety shut-off capability for the system, should the mirror control drive column 60 move too far North or South. When either switch of this pair is activated, a safety shut off function 105 is provided and the output signal from the ambient detector 104, if present, is interupted. The North-South spacing interval between the switches of the set 106 is greater than the spacing between the other sets of switches 108 and 110 and this outer pair of switches are only activated when the system has malfunctioned.

Figure 10:
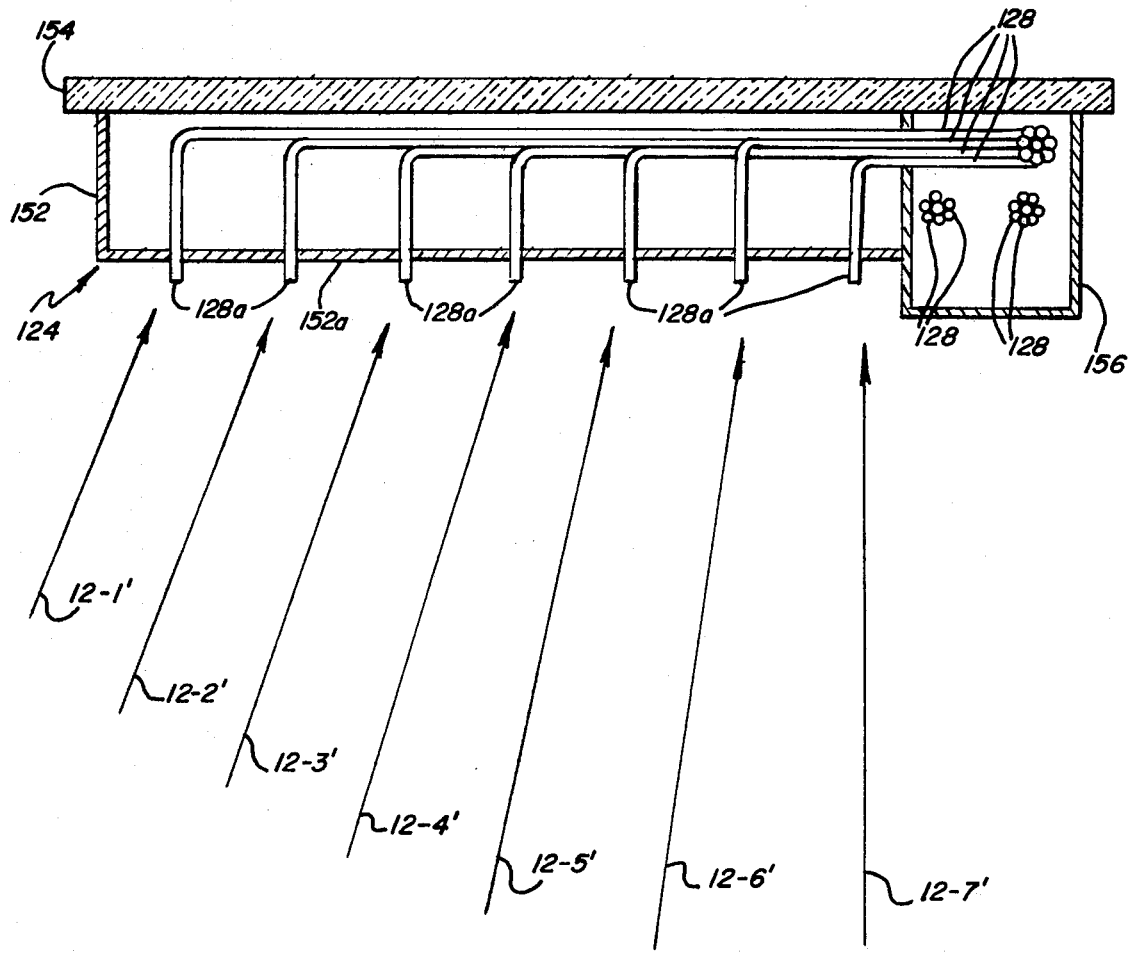
FIG. 10 is a North-South vertical, cross-sectional view taken substantially along lines 10—10 of FIG. 9 showing in enlarged detail the construction of a focus sensor in accordance with the invention.
Figure 11:
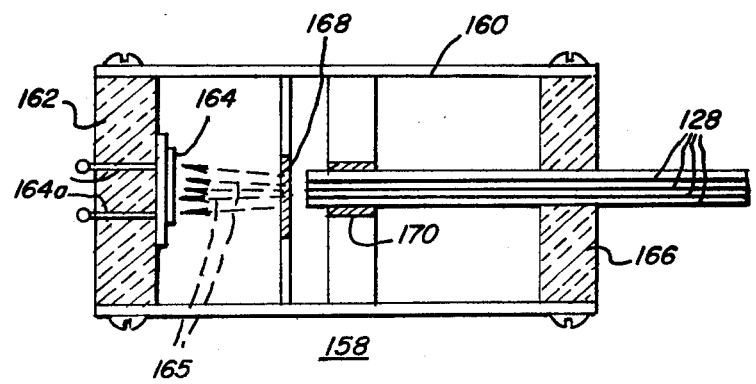
FIG. 11 is a longitudinal cross-sectional view taken substantially along lines 11—11 of FIG. 9 showing in enlarged detail construction of a light detector element in accordance with the invention.

An "ON" or enabling output signal from the ambient light detector control 104 provides an input signal to a focus detector switch 120. The focus detector provides an enabling signal via an output lead 176 whenever the focus image 123 of the sun rays 12-1', -2', is not covering both sensors 124 and 126 of a pair of "rough" focus elements. Referring to FIGS. 9, 10 and 11, these elements each comprise a plurality of elongated optical light transmitting fibers 128 having light receiving ends 128a pointed downwardly toward the mirrors 40 for picking up reflected light rays therefrom. The sensors 124 and 126 are spaced in parallel between a pair of outwardly spaced, parallel, "fine" focus sensors 130 and 132 and as indicated schematically in FIG. 9, the focus image 123 of the reflected light rays 12-1', -2', -3', etc. from the mirrors 40 is of a width larger than the spacing between the outer sensors so that when the image is properly centered with respect to the array of both the rough and fine focus sensors, all of the sensor elements are shadowed as illustrated. Should the image move out of centered position in either direction as indicated by the arrow "B", one of the outer "fine" focus sensors 130 or 132 will be uncovered and accordingly, the reflected sunlight input to that sensor will be greatly reduced.

Referring to FIG. 10, each of the four focus sensors include an elongated, hollow tubular structure 152 having a bottom wall 152a therein facing the mirrors and provided with a plurality of longitudinally spaced apart openings for accommodating the downwardly extending lower end portions 128a of the respective optical fibers 128. The sensor tubes 152 are mounted in spaced parallel rows on a base plate 154 which is mounted above the central rail 42 of the floor structure as shown in FIG. 1 and spaced just below the elongated collector element 30. Each of the sensor tubular elements or housings 152 is interconnected at one end to a transverse tubular structure 156 which is adapted to carry a plurality of bundles of the optic fibers or light pipes from each of the focus sensor elements as best shown in FIG. 10. These bundles of optical fibers are passed outwardly through the back wall 22 of the concentrator housing structure 14 and each is connected to a light detector unit 158 having a hollow housing 160 and adapted to convert solar energy into an electrical output.

The light detectors are shown in detail in FIG. 11 and each includes an end plug 162 forming a base for a solar cell 164 having a pair of leads 164a extending externally thereof for interconnection with the electrical circuit of the control system. The solar cells 164 are designed to receive infra-red rays 165 passing through an infra-red filter 168 from the exposed ends of the bundle of optical light fibers 128 which extend into the housing 160 from the opposite end through an opening in a removable opposite end plug 166. The optical fibers are centered coaxially with respect to the filter 168 and the solar cell 164 by means of an internal bracket 170 so that an electrical signal is generated by the solar cell in response to the solar energy of the infra-red range that is received. Similarly, referring to FIG. 9, the ambient solar cell 102 may be provided with an infra-red filter 102a so that the cell responds chiefly to infra-red energy received from the sun.

The electrical signals generated in response to the light sensed by the inner two sensor or "rough" focus elements 124 and 126 are directed to the focus detector control 120 through a pair of input cables 172 and 174 (FIG. 9). In the event the image 123 of focused reflected energy is in a position covering both of the sensor elements 124 and 126, an input signal is sent to the focus detector control 120 through both the input cables 172 and 174.

In this condition, an output signal is generated by the focus detector and is sent via one output cable 176 to a drive and direction control 180 which provides drive and direction signals via output cables 182 and 184 labeled North and South, respectively, for energizing the motor 78 in the proper direction to pivot the mirrors and change the position of focused image 123 of the sun with respect to the sensors. The output cable 176 from the focus detector control provides an "on-focus, drive disable" signal to the drive and direction control and in response to this signal, the drive and direction control unit will then only permit incremental drive impules to be dispatched through the output leads 182 or 184 as will be described hereinafter. In the event, however, that the focus image 123 covers only one and not the other of the inner two "rough" focus sensors 124 and 126, an electrical signal will be provided to the focus detector control 120 from only one of the input leads 172 or 174. When this condition occurs, an "out-of-focus drive enable" signal is provided via another output lead 186 also connected to the drive and direction control switch 180. With an enabling signal, activation of the motor 78 in the appropriate direction is accomplished to pivot the mirrors in the corresponding direction to bring the image 123 into centered position. It will thus be seen that if the image 123 is covering both of the "rough" focus sensor elements 126 and 124, the drive and direction control 180 will generally be disabled from providing normal speed drive outputs to the motor 78. However, if only one and not the other of the inner two sensors 126 and 124 is covered by the image, the "Out of Focus Drive Enable" signal will be provided so that the drive direction control 180 then functions to energize the motor 78 in the proper direction to bring the image into centered position with respect to the array of "rough" and "fine" focus detectors 124, 126, 130 and 132, respectively.

When the image 123 is accurately centered as indicated in FIG. 9, it is wide enough to cover the outer two "fine" focus sensors 130 and 132 and the bundles of light pipes 128 from these sensors, generate output signals that are sent via respective output cables 188 and 190 labeled North and South to the drive and direction control unit 180. When signals are received from both of the North and South cables, the drive and direction control 180 does not generate a drive signal for either direction. However, should the image move out of centered position so that one and not the other of the outer two "fine" focus sensors 130 and 132 is uncovered, then either a North or South drive output is sent via the cables 188 or 190 to the drive and direction control unit to energize the motor 78.

During a normal operation when there is enough ambient light to warrant the collection of energy, the circuit 100 is operable to drive the mirrors 40 to rotate first in one direction and then the other until the sun's image is acquired and the image 123 is centered over the sensor array. When the image is not centered with respect to the array of sensors, the mirrors are driven by the motor 78 to pivot in a direction, for example, to move the image toward the North or until the North switch of the set of limit switches 110 is activated. When this switch is closed, the direction of image movement is reversed toward the South. As viewed in FIG. 2, if the image 123 is actually positioned to the South of the area of the collector 30 while the mirrors 40 are being driven to pivot in a counter-clockwise direction, the Southerly limit switch of the set 110 is contacted and this causes a flip-flop circuit in the drive and directional control unit 180 to reverse the drive signal output and cause the motor 78 to reverse the direction of mirror tilting.

Similarly, when the North limit switch of the set 110 is activated, the flip-flop is reactivated to reverse the direction of drive of the motor 78. Once the inner two "rough" focus sensors 124 and 126 are covered by the image 123 the "On-Focus Drive Disable" signal is sent to the control unit 180 via the cable 176 as described and the drive and direction control unit is then operable to drive the motor with short, timed drive pulses via respective input lines 182 and 184 to track the sun and keep the image centered as the sun angle changes.

For this purpose, the circuit 100 includes a square wave impulse generator 192 which provides a train of pulses to an impulse driver control 194. The impulse driver control is adjustable to select the number, frequency and/or time duration of a train of pulses which are directed into the drive and directional control 180 via an input line 196. Dependent upon the input signal to the drive and direction control from the North and/or South input cables 188 and 190 and the input received from the reversing set of limit switches 110, the motor 78 is driven to rotate in short duration steps and this maintains a centered position for the image 123 on the array of focus sensor. This type of pulsed drive occurs even though the focus detector control 120 is providing an "On-Focus Drive Disable Signal" via the input line 176 to the drive and direction control.

In accordance with the invention, the motor 78 is provided with an electric brake 198 and the limit switches 108, which are positioned intermediate between the outer set of switches 106 and the inner set 110, are provided for effecting braking action on the motor through a brake timer 200. The momentum of the mirror drive system generally carries the mechanism a slight distance beyond the limit set by the inside set of reversing switches 110, and as this occurs, the North or South switches of the intermediate braking switch set 108 are closed to send an appropriate brake engaging signal to the timer via a "one-shot" control 202. The "one-shot" activates the brake timer to engage the motor brake 198 for a selected interval to aid in the process of arresting momentum and reversing of the mirror drive direction. The motor braking action is initiated slightly after or substantially at the same time therewith as the direction of motor drive is reversed by the action of the switches 110. This aids in increased motor life by reducing the shock loads on the motor and drive train during reversing of direction.

The "one-shot" 202 also receives an input signal via a line 204 connected to the "On-Focus Drive Disable" line 176 and is operative to override the input signals from either this source or from the North or South brake engaging limit switches 108 so that the brake timer will be activated to release the brake 198 momentarily on the first pulse of a train of pulses to permit incremental drive to proceed. The "one-shot" thus sees only the first one of a train of brake engaging pulses from an input source, and after a brake engagement is achieved for a brief interval as determined by the timer 200, incremental drive may proceed. Signals via the line cooperate with North or South drive inputs from the cables 188 and 190 and the switch set 110 is the drive and directional control 180 to control the drive and direction of the motor 78 to drive the mirrors to maintain a centered position of the focused image 123 on the focus sensor array.

When the atmospheric conditions are cloudy, but there is enough general light level to go above the selected ambient "turn-on" point as selected by the detector control 104, the energy at the visual end of the spectrum of the suns's rays may be diffused in the clouds. In this situation, the ultra-violet light appears to reflect from a wide area at the cloud base towards the concentrator. In this type of condition, it would normally be very difficult for the concentrator to see and track the sun's image. In order to maintain a maximum efficiency of concentration and collection of sun or solar energy, it may be desirable to operate the concentrator 10 even though the sun is not visible. By using infra-red filters as described, the concentrator 10 is able to track the sun's inage through cloud decks and layers even though a visual or ultra-violet image of the sun are diffused in the cloud cover. Because of this, the concentrator is extremely efficient in overall operation and does not have to be shut down on cloudy days or during cloudy intervals of a day when there may be sufficient diffused solar energy available to economically warrant operation. By the use of infra-red filters it is possible for the tracking and mirror control system to follow the image of the sun through cloud layers whenever there is enough ambient energy available to warrant the operation of the concentrator.

Most of the electronic components of the circuit 100 including the ambient solar cell 102 and the light detectors 158 are located externally of the concentrator housing 14 and thus are not subject to high temperatures which may occur during the day around the apex or ridge portion of the structure near the collector 30. The optic fiber light pipes 128 provide a means for remotely positioning the electronic and the solar cells 164 away from and out of the high temperature regions and at the same time provide excellent focusing accuracy.

Although the present invention has been described with reference to a single illustrated embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A solar energy concentrator comprising:
an elongated collector for receiving concentrated solar energy and positioned to extend longitudinally in an East-West direction spaced above a supporting surface;
a horizontal array of separate, elongated, thin, flat, solar energy reflectors for reflecting received solar energy and focusing the same upwardly toward said collector,
said reflectors mounted in parallel, elongated rows extended parallel of said collector and at a level spaced below the same with said reflectors in end to end relation in each row and forming columns of reflectors normal to said rows;
support means for supporting opposite ends of each reflector, said support means including a substantially flat base member having an upstanding flange portion on opposite sides and means pivotally mounting each base portion, said support means being unobstructed in a generally upward direction thereby permitting removal and/or replacement of each reflector by movement in a generally upward and/or downward direction with respect to said support means associated therewith;
a generally horizontal floor structure having a plurality of spaced apart, parallel rails disposed adjacent opposite ends of the reflectors in each column of the array, each said reflector being independently, pivotally supported from a pair of said rails at opposite ends;
an enclosure above said floor structure comprising a roof structure sloping upwardly of a longitudinal edge of said floor structure toward a ridge parallel of said collector, said roof structure including transparent panels for transmitting solar energy downwardly toward said reflectors on said floor structure, and a back wall sloping upwardly of an opposite longitudinal edge of said floor structure joining said roof structure adjacent said ridge; and
drive means interconnecting said supports in each column for pivotally moving said reflectors in unison to substantially continuously reflect received solar energy toward said collector as the angle of elevation of said received solar energy changes.

2. The solar energy concentrator of claim 1 wherein;
said drive means includes an actuating arm for each support having one end secured to said support and extending radially outwardly of the longitudinal pivot axis thereof, and
a column drive element pivotally connected to the arm of each support in a column of said array for pivotally moving said reflectors of said column in unison.

3. The solar energy concentrator of claim 2 including;
adjustable connector means for securing each arm to an associated support at a selected one of a plurality of different relative angular positions about said longitudinal pivot axis.

4. The solar energy concentrator of claim 3 wherein said connector means includes;
means for securing each arm to an associated support throughout a range of relative angular positions therebetween.

5. The solar energy concentrator of claim 1 wherein said drive means includes;
means for sensing the position of said focused solar energy relative to the position of said collector and moving said reflectors in response thereto to maximize the energy received by said collector.

6. The solar energy concentrator of claim 5 wherein said sensing means includes a pair of sensors dispose on opposite sides of said collector adjacent the level thereof for activating said drive means to move said reflectors to maintain the focus of solar energy on said collector as the elevation angle of the solar energy received is changing.

7. The solar energy concentrator of claim 1 wherein said drive means includes;
means for sensing the level of solar energy focused toward said collector for activating and deactivating said drive means for movement of said reflectors.

8. The solar energy concentrator of claim 7 including;
means for deactivating said drive means when said level of focused solar energy is below a selected minimum value.

9. The solar energy concentrator of claim 7 including;
means for activating said drive means for movement of said reflectors to focus reflected solar energy toward said collector when said level of focused solar energy is above a selected minimum value.

10. The solar energy concentrator of claim 2 wherein said drive means includes;
   an elongated shaft parallel of said collector supported for axial rotation adjacent said floor structure and one or more torque arms mounted on said shaft adjacent each of said rails and interconnected with a column element associated therewith for moving the same to rotate said reflectors in response to rotation of said shaft.

11. The solar energy concentrator of claim 10 wherein said drive means includes;
   rotor means for rotating said shaft; and
   means for sensing the position of said focused solar energy relative to said collector and energizing said motor means to rotate said elongated shaft for movement of said reflectors to maximize the energy received by said collector.

12. The solar energy concentrator of claim 11 wherein said motor means includes;
   a reversible electric motor having a rotor shaft and reduction gear means drivingly interconnecting said rotor shaft and said elongated shaft.

13. The solar energy concentrator of claim 11 wherein said motor means is drivingly interconnected with said elongated shaft adjacent a mid-portion thereof.

14. The solar energy concentrator of claim 12 wherein said reduction gear means includes an interconnecting worm and gear combination.

15. The solar energy concentrator of claim 13 including a plurality of columns of said reflectors disposed on opposite sides of said motor means longitudinally along an elongated shaft.

16. The solar energy concentrator of claim 1 wherein said drive means includes;
   feedback means responsive to the position of said focused solar energy for pivoting said reflectors to maximize said energy focused on said collector.

17. The solar energy concentrator of claim 1 including feedback means responsive to a reflected image of said solar energy focused toward said collector.

18. The solar energy concentrator of claim 1 wherein said reflectors comprise mirrors removably mounted and supported from an underside on a pivotally mounted support.

19. The solar energy concentrator of claim 1 including a pair of end wall structures extending upwardly of said floor structure joining said roof structure and said back wall for enclosing said reflectors and collector from external atmosphere.

20. The solar energy concentrator of claim 1 wherein said collector is supported adjacent said ridge.

* * * * *